Patented Oct. 10, 1950

2,525,530

UNITED STATES PATENT OFFICE 2,525,530

METHOD FOR PRODUCING VINYL TRIFLUOROACETATE

Joseph B. Dickey and Theodore E. Stanin, Rochester, N. Y., assignors to Eastman Kodak Company, Rochester, N. Y., a corporation of New Jersey No Drawing. Application March 14, 1946, Serial No. 654,523

2 Claims. (Cl. 260—487)

This invention relates to fluoroacetoxy compounds and to a process for preparing the same.

It is known that certain carboxylic acids, e. g., acetic acid, chloroacetic acid, trichloracetic acid, add to acetylene, in the presence of a mercury salt catalyst to give vinyl carboxylic esters. We have now found that trifluoroacetic acid, difluoroacetic acid and chlorodifluoracetic acid add to acetylene to give vinyl carboxylic esters which are less inflammable than compounds such as vinyl acetate or vinyl chloroacetate. Moreover, we have found that vinyl trifluoroacetate, vinyl difluoroacetate and vinyl difluorochloracetate are much more stable to heat and water than vinyl dichloroacetate or vinyl trichloroacetate. We have further found other fluoroacetoxy compounds having similar advantages of heat and water stability over corresponding acetoxy compounds. Our new fluoroacetoxy compounds are useful as chemical intermediates, for example, they can be readily halogenated, and many of them can be homopolymerized and copolymerized to valuable resinous materials. Some of these polymers are described and claimed in our copending applications; the vinyl fluoroacetoxy species, Serial No. 654,524 (now abandoned), and the alpha-fluoroacetoxyacrylonitrile species, Serial No. 654,525, (now United States 2,464,120, dated March 8, 1949) both filed of even date herewith.

It is, accordingly, an object of our invention to provide new fluoroacetoxy compounds. A further object is to provide a process for preparing such compounds. Other objects will become apparent hereinafter.

In accordance with our invention, we prepare our fluoroacetoxy compounds by adding trifluoracetic acid, difluoroacetic acid or difluorochloroacetic acid to an acetylene hydrocarbon of the following general formula:

I.    R—C≡CH wherein R represent a hydrogen atom, an alkyl group (e. g. methyl, ethyl, n-butyl, n-amyl, etc.) or an aryl group, e. g. phenyl, in the presence of a catalyst (e. g., a mercury salt, such as mercury sulfate or mercury phosphate, with or without another substance capable of acting as a carrier, a mercury sulfonate, a mixture of mercury phosphate and orthophosphoric acid, mercury acetate, a mixture of mercuric oxide and an acid such as acetic or sulfuric acid, a mixture of a mercury salt and boron trifluoride), a zinc or cadmium salt of a carboxylic acid such as acetic, propionic, and the like. This process gives fluoroacetoxy compounds which can be represented by the following general formula:

II. 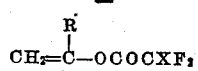

wherein R represents a member selected from the group consisting of a hydrogen atom, an alkyl group or an aryl group, and X represents a hydrogen atom, a fluorine atom or a chlorine atom.

To obtain compounds which can be represented by the following formula:

III. 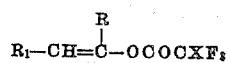

wherein R and R₁ represent hydrogen atoms, alkyl groups, and aryl groups of the benzene series, and wherein R and R₁ combined represent a trimethylene group or a 1,4-butylene group, we condense an aldehyde, for example, acetaldehyde, propionaldehyde, butyraldehyde, phenylacetaldehyde or a ketone, for example, methylethyl ketone, butyrone, ethylpropyl ketone, chlorethyl ethyl ketone, cyclohexanone, cyclopentanone, acetophenone, phenylacetone, and similar kinds of aldehydes and ketones, with trifluoroacetic anhydride, difluoroacetic anhydride or chlorodifluoroacetic anhydride, in the presence of an alkali salt of the acid.

To obtain compounds which can be represented by the following general formula:

IV. 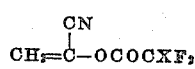

we condense a β-halogeno-α-hydroxy propionitrile with trifluoroacetic anhydride, difluoroacetic anhydride or difluorochloroacetic anhydride and react the resulting β-halogeno-α-fluoroacetoxy propionitrile with a tertiary organic amine, e. g., quinoline, dimethylaniline, diethylamine, pyridine, triamylamine, N-amylpiperidine, etc. The aforesaid β-halogeno-α-fluoroacetoxy propionitriles can also be prepared by reacting a β-halogeno-α-hydroxypropionitrile with a compound of formula II above, especially isopropenyl trifluoroacetate, isopropenyl difluoroacetate or isopropenyl difluorochloroacetate, in the presence of an acid catalyst, e. g., sulfuric acid, sulfamic acid, p-toluenesulfonic acid, hydrochloric acid, phosphoric acid, alkylsulfonic acids, chlorosulfonic acid, trichloroacetic acid, and the like.

To obtain compounds of the following general formula:

V. 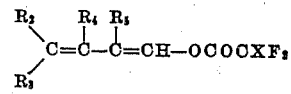

wherein $R_2$, $R_3$, $R_4$, and $R_5$ represent hydrogen atoms, alkyl groups or halogen atoms, and X represents a hydrogen atom, a fluorine atom or a chlorine atom, we condense a mono unsaturated aldehyde such as crotonaldehyde or a substituted crotonaldehyde with trifluoroacetic anhydride, difluoroacetic anhydride or difluorochloroacetic anhydride, in the presence of an acid catalyst, preferably sulfuric acid, although other acids can likewise be employed, for example, sulfamic acid, p-toluenesulfonic acid, hydrochloric acid, phosphoric acid, alkylsulfonic acid, chlorosulfonic acid, trichloroacetic acid, and similar kinds of acids.

The reacting ratios of fluoroacetic acid and its derivatives with acetylene, ketones, aldehydes, nitriles or vinyl esters can be varied within fairly wide limits. For example, our preferred process with acetylene hydrocarbons contemplates the use of an excess of the hydrocarbon, but it is also possible to obtain our new vinyl fluoroacetoxy compounds employing a much smaller proportion of the acetylene hydrocarbon. In the case of the condensation of a ketone or aldehyde with a fluoroacetic compound, the ketone and aldehyde are employed preferably in slight excess. With hydroxyalkylnitriles, the fluoroacetic anhydride compound usually constitutes the larger proportion of the reactants. However, our new compounds are not limited to the specific proportions of the examples given, since they can be obtained in variable yields from reaction mixtures comprising from about 5 to 95 molecular parts of the fluoroacetic compound to about from 95 to 5 molecular parts of the acetylene hydrocarbon, ketone, aldehyde or vinyl compound.

The following examples will serve to illustrate our new compounds and the manner of obtaining the same.

*Example I.—Vinyl trifluoroacetate by the acetylene process*

25 grams of trifluoroacetic acid were placed in a 100 c.c. three-necked flask equipped with an air stirrer reflux condenser and a gas inlet tube (fritted glass for fine bubbles). There was added to the acid, 0.48 gram of mercuric oxide, then about 2.0 c.c. of 60 per cent oleum in glacial acetic acid (1 c.c.=0.24 gram of HgO) measured from a fine burette. The mixture was well stirred and then acetylene gas passed into the mixture for a period of about 15 hours. The gas was first purified by bubbling through water and then through concentrated sulfuric acid. The contents of the reaction flask was treated with 2 grams of anhydrous sodium acetate to destroy the catalyst, and then distilled using a 50 c.c. modified Claisen flask with a 10" Vigreaux side arm. The distilling flask was immersed in a water bath for the first fraction, which distilled over at 26–40° C. The remainder, representing the ethylidene ester, was distilled at 100–116° C. The 26–40° C. fraction was redistilled, and a good cut obtained at 38–40° C. This was redistilled again, thereby obtaining a yield of about 5 grams or roughly 16 per cent of theoretical of vinyl trifluoroacetate, boiling point 38–39° C., density 1.3159 at 23° C. The molecular weight by the vapor density method was found to be 140.2. The ester homopolymerized in three days at 50° C., in the presence of a trace of peroxide, to a hard transparent solid, soluble in acetone. Analysis of the resin gave 34.12 per cent by weight of carbon and 2.27 per cent by weight of hydrogen, as compared with theoretical of 34.3 per cent carbon and 2.14 per cent hydrogen for vinyl trifluoroacetate. By substituting an equivalent quantity of methylacetylene for the acetylene in the above example, there was obtained a good yield of isopropenyltrifluoroacetate, boiling at about 63–65° C. The vinyl difluoro- and difluorochloro-acetates were prepared by the method above described by substituting in place of trifluoroacetic acid, the corresponding difluoroacetic and difluorochloroacetic acids.

*Example II.—3-trifluoroacetoxypentene-2*

40 grams of diethylketone, 100 grams of trifluoroacetic anhydride and 10 grams of sodium trifluoroacetate were charged into an autoclave and heated at 200–210 C. for several hours with vigorous stirring. When cool, the sodium trifluoroacetate was filtered off and the filtrate fractionated. There was obtained a good yield of 3-trifluoroacetoxypentene-2. In place of diethyl ketone in the above example, there can be substituted methylethyl ketone, ethylpropyl ketone, butyrone, chloroethyl ethyl ketone, cyclohexanone acetophenone, phenlacetone or cylcopentanone to obtain corresponding trifluoroacetoxy compounds.

*Example III.—2-difluoroacetoxybutene-2*

75 grams of methylethyl ketone, 125 grams of difluoroacetic anhydride and 10 grams of sodium difluoroacetate were charged into an autoclave and heated at 200–210° C., for a period of several hours with vigorous stirring. There was obtained, after fractionation, a good yield of 2-difluoroacetoxybutene-2.

By substituting about 175 grams of difluorochloroacetic anhydride for the difluoroacetic anhydride in the above example, there was obtained a good yield of the corresponding 2-difluorochloroacetoxybutene-2.

*Example IV.—Vinyl trifluoroacetate by the aldehyde process*

40 grams of acetaldehyde, 100 grams of trifluoroacetic anhydride and 10 grams of sodium trifluoroacetate were heated in a shaking autoclave for several hours at about 200° C. When cool, water was added to hydrolyze the anhydride, and the solution extracted with benzene, the latter being washed with fresh water and distilled. There was obtained a good yield of vinyl trifluoroacetate. In place of acetaldehyde in the above example, there can be substituted propionaldehyde, butyraldehyde or phenylacetaldehyde, to obtain the corresponding methylvinyl-, ethylvinyl-, and phenylvinyl-trifluoroacetate compounds.

*Example V.—Propenyl difluorochloroacetate*

53 grams of propionaldehyde, 116 grams of difluorochloroacetic anhydride and 10 grams of sodium difluorochloroacetate were reacted and purified following the procedure described in above Example IV. There was obtained a good yield of propenyl difluorochloroacetate. In a similar manner, by substituting the difluorochloroacetic acid with about 83 grams of difluoroacetic acid, there was obtained the corresponding propenyl difluoroacetate. Likewise, there can be prepared the propenyl, 1-butenyl and styryl derivatives of difluoroacetic acid and difluorochloroacetic acid by employing the corresponding aldehydes and acid anhydrides.

Example VI.—1-trifluoroacetoxy-2-chloro-butadiene-1,3

67 grams of alpha-chlorocrotonaldehyde, 110 grams of isopropenyltrifluoroacetate and 0.5 gram sulfuric acid were heated together on a steam bath for several hours. On distillation, there was obtained a good yield of 1-trifluoroacetoxy-2-chlorobutadiene-1,3. In place of alpha-crotonaldehyde in the above example, there can be substituted methylcrotonaldehyde or fluorocrotonaldehyde to obtain 1-trifluoroacetoxy-2-methylbutadiene-1,3 and 1-trifluoroacetoxy-2-fluorobutadiene-1,3. By substituting an equivalent amount of isopropenyldifluoroacetate or isopropenyldifluorochloroacetate for the isopropenyltrifluoroacetate in the above example, there can be obtained the corresponding compounds, 1-difluoroacetoxy-2-chlorobutadiene-1,3,
1-difluorochloroacetoxy-2-chlorobutadiene-1,3,
1-difluoroacetoxy-2-methylbutadiene-1,3,
1-difluorochloroacetoxy-2-methylbutadiene-1,3,
1-difluoroacetoxy-2-fluorobutadiene-1,3, and
1-difluorochloroacetoxy-2-fluorobutadiene-1,3.

Example VII.—Alpha-trifluoroacetoxy acrylonitrile 50 grams of beta-chloro-alpha-hydroxy propionitrile and 150 grams of trifluoroacetic anhydride were reacted together on a water bath. On distillation of the reaction mixture, there was obtained as a distillate a good yield of β-chloro-α-trifluoroacetoxy propionitrile. The latter compound was then treated with about 1.25 equivalent of diethylaniline to give as a product alpha-trifluoroacetoxyacrylonitrile, boiling at 140–142° C., under a pressure of 770 mm. The above nitrile can be transformed readily to the corresponding esters and amides by the general procedures employed for nitrile conversions, for example, to alpha-trifluoroacetoxy methylacrylate and to alpha-trifluoroacetoxyacrylic amide. In place of trifluoroacetic anhydride in the above example, there can be substituted equivalent amounts of difluoroacetic anhydride or difluorochloroacetic anhydride to obtain the corresponding alpha-difluoroacetoxyacrylonitrile and alpha-difluorochloroacetoxyacrylonitrile, and the esters and amides thereof.

What we claim is:

1. A process for preparing vinyl trifluoroacetate which comprises reacting acetylene with trifluoroacetic acid in the presence of a catalyst consisting of mercuric oxide, oleum and acetic acid, then adding anhydrous sodium acetate to the reaction mixture and separating the vinyl trifluoroacetate by fractional distillation of the mixture.

2. A process for preparing vinyl trifluoroacetate which comprises reacting 25 grams of trifluoroacetic acid with an excess of acetylene in the presence of 0.48 gram of mercuric oxide and 2 cc. of 60 per cent oleum in glacial acetic acid, then adding 2 grams of anhydrous sodium acetate to the reaction mixture and separating the vinyl trifluoroacetate by fractional distillation of the mixture.

JOSEPH B. DICKEY.
THEODORE E. STANIN.

REFERENCES CITED

The following references are of record in the file of this patent:

UNITED STATES PATENTS

| Number | Name | Date |
| --- | --- | --- |
| 1,084,581 | Klatte | Jan. 13, 1914 |
| 2,266,771 | Lange | Dec. 23, 1941 |
| 2,436,144 | Hawk | Feb. 17, 1948 |

FOREIGN PATENTS

| Number | Country | Date |
| --- | --- | --- |
| 288,707 | Great Britain | Apr. 11, 1928 |

OTHER REFERENCES

Swarts, "Chem. Zentralblatt," 1923, I, page 66.